(12) United States Patent
Mayerle (10) Patent No.: US 8,942,896 B2
(45) Date of Patent: Jan. 27, 2015

(54) SEED METER CONTROL SYSTEM

(71) Applicant: CNH Canada, Ltd., Saskatoon (CA)

(72) Inventor: Dean J. Mayerle, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 13/829,808

(22) Filed: Mar. 14, 2013

(65) Prior Publication Data

US 2014/0261118 A1   Sep. 18, 2014

(51) Int. Cl.
*A01C 7/04* (2006.01)
*A01C 5/06* (2006.01)
*A01C 7/10* (2006.01)

(52) U.S. Cl.
CPC .............. *A01C 7/102* (2013.01); *A01C 7/046* (2013.01); *A01C 5/062* (2013.01); *A01C 7/105* (2013.01)
USPC ............................................. 701/50; 111/185

(58) Field of Classification Search
None
See application file for complete search history.

(56) References Cited

U.S. PATENT DOCUMENTS

| | | |
|---|---|---|
| 3,855,953 A | 12/1974 | Fathauer et al. |
| 3,912,121 A | 10/1975 | Steffen |
| 3,927,400 A | 12/1975 | Knepler |
| 4,009,799 A | 3/1977 | Fathauer |
| 4,054,779 A | 10/1977 | Wilke |
| 4,122,974 A | 10/1978 | Harbert et al. |
| 4,159,064 A | 6/1979 | Hood |
| 4,238,790 A | 12/1980 | Balogh et al. |
| 4,246,469 A | 1/1981 | Merlo |
| 4,268,825 A | 5/1981 | Kaplan |
| 4,333,096 A | 6/1982 | Jenkins et al. |
| 4,369,895 A | 1/1983 | McCarty et al. |
| 4,710,757 A | 12/1987 | Haase |
| 5,177,470 A | 1/1993 | Repas |
| 5,260,875 A | 11/1993 | Tofte et al. |
| 5,323,721 A | 6/1994 | Tofte et al. |
| 5,598,794 A | 2/1997 | Harms et al. |
| 5,635,911 A | 6/1997 | Landers et al. |
| 5,923,262 A | 7/1999 | Fuss et al. |
| 5,956,255 A | 9/1999 | Flamme |
| 5,963,139 A | 10/1999 | Littke |
| 6,009,354 A | 12/1999 | Flamme et al. |
| 6,024,035 A | 2/2000 | Flamme |
| 6,070,539 A | 6/2000 | Flamme et al. |
| 6,091,997 A | 7/2000 | Flamme et al. |
| 6,386,128 B1 | 5/2002 | Svoboda et al. |
| 6,615,755 B2 | 9/2003 | Moszoro |
| 6,626,120 B2 | 9/2003 | Bogner et al. |
| 6,661,514 B1 | 12/2003 | Tevs et al. |
| 7,451,713 B2 * | 11/2008 | Mariman et al. ............... 111/185 |
| 7,478,603 B2 | 1/2009 | Riewerts et al. |
| 7,717,048 B2 | 5/2010 | Peterson, Jr. et al. |
| 8,078,367 B2 | 12/2011 | Sauder et al. |
| 2007/0266917 A1* | 11/2007 | Riewerts et al. ............... 111/200 |
| 2009/0090284 A1* | 4/2009 | Peterson et al. ............... 111/185 |
| 2010/0010667 A1* | 1/2010 | Sauder et al. .................. 700/231 |

(Continued)

*Primary Examiner* — Michael J Zanelli
(74) *Attorney, Agent, or Firm* — Rebecca L. Henkel (57) ABSTRACT

A seed meter control system is provided that allows for controlling seed meters of a row crop planter in a manner that reduces frequency of skip occurrences in which no seeds are delivered during a delivery event and double occurrences in which more than one seed is delivered during a delivery event. A target seeding session performance may be compared with an observed seeding session performance value and a delivery anomaly value to determine whether to make a corrective action by controlling at least one of the seed meters.

16 Claims, 5 Drawing Sheets

(56) References Cited

U.S. PATENT DOCUMENTS

| | | |
|---|---|---|
| 2011/0046776 A1 | 2/2011 | Goldman et al. |
| 2012/0004768 A1 | 1/2012 | Schweitzer et al. |
| 2012/0042813 A1 | 2/2012 | Liu et al. |
| 2012/0046838 A1 | 2/2012 | Landphair et al. |
| 2012/0266795 A1* | 10/2012 | Silbernagel et al. .......... 111/149 |
| 2014/0076219 A1* | 3/2014 | Adams et al. ................. 111/185 |
| 2014/0165891 A1* | 6/2014 | Garner et al. ................. 111/170 |

* cited by examiner

SEED METER CONTROL SYSTEM

FIELD OF THE INVENTION

The subject matter disclosed herein relates generally to row-crop planters or seeders having seed meters and, in particular, to systems for controlling and monitoring seed meters.

BACKGROUND OF THE INVENTION

Modern farming practices strive to increase yields of agricultural fields. One way of increasing yields is to improve evenness of plant emergence. Improvements in consistency of seed depth and consistent in-row spacing typically improve evenness of plant emergence. However, in a single row-crop planter, there can be differences in performance in each of the individual row units and corresponding seed meters which may lead to inconsistencies in in-row spacing and less than optimal evenness of plant emergence.

SUMMARY OF THE INVENTION

The present invention is directed to a seed meter control system of a row-crop planter having seed meters for singulated delivery of seed and that allows for making decisions about whether to operate a planter as is, operate it with alternate operating parameters of the seed meter(s), or make repairs. The seed meter control system may allow for detecting intervals between seeds delivered by the seed meter(s) and determining performance and/or performance characteristics based on statistical calculations on the intervals and/or other performance characteristics. This may allow for controlling operating parameters of the seed meters while using the planter while in use for on-the-go performance tuning toward an optimum performance. The seed meter control system may allow for controlling seed meters of a row crop planter in a manner that reduces frequency of skip occurrences in which no seeds are delivered during a delivery event and double occurrences in which more than one seed is delivered during a delivery event. A target seeding session performance may be compared with an observed seeding session performance value and a delivery anomaly value to determine whether to make a corrective action by controlling at least one of the seed meters. This may allow for improving in-row seed spacing and accurate seed populations that may provide even plant emergence from an agricultural field.

According to an aspect of the invention, a seed meter control system is provided for use with a planter opening multiple furrows in an agricultural field. The seed meter control system includes multiple seed meters arranged on the planter and receiving seeds from a hopper for bulk storage of seeds. Each of the multiple seed meters singulates the seeds for releasing the seeds out of the seed meter for individual delivery into the furrow during delivery events. Each delivery event may define a period of time for releasing an individual seed from the seed meter and directing the individual seed from the seed meter into the furrow. The seed meter control system may include a sensor arranged with respect to each of the multiple seed meters for detecting seed presence during the delivery events and transmitting a corresponding signal. A controller of the seed meter control system may monitor at least one performance characteristic of each of the seed meters and defines a corresponding observed seeding session performance value. The controller may be operably connected to the sensors of the seed meters for receiving the signals therefrom. The controller may identify a delivery anomaly based on the signals from the sensors of the seed meters corresponding to a failure to deliver an individual seed during at least one delivery event. The delivery anomaly may include at least a first delivery anomaly component and a second delivery anomaly component. The first delivery anomaly component may define one of a frequency of skip or double occurrences. Each skip occurrence may correspond to an absence of a seed during a delivery event and each double occurrence may correspond to more than one seed delivered during a delivery event. The controller may define the second delivery anomaly component by evaluating the first delivery anomaly component with respect to the observed seeding session performance value. This may allow the controller to identify potential performance issues with the seed meters that could influence seed spacing.

According to another aspect of the invention, the controller may define a target seeding session performance value corresponding to a predetermined target spacing characteristic of seeds delivered from the seed meters. The controller may determine whether a corrective action is needed based on an evaluation of the target seeding session performance value, the observed seeding session performance value, and at least one of the first and second delivery anomaly components. The controller may control at least one of the seed meters to make the corrective action for reducing a discrepancy between the target seeding session performance value and the observed seeding session performance value, which may include indicating to a user that the correction action should be made to the seed meter(s). This may allow for on-the-go automatic adjustments of the seed meter(s) or an indication that a user should manually or otherwise adjust the seed meter(s) for improving seed spacing.

According to another aspect of the invention, a method is provided for controlling a seed meter(s) while row-crop planting. The method includes opening a furrow in an agricultural field with a furrow-opening mechanism mounted to a planter and arranged for engaging the agricultural field. Seeds are delivered from a hopper for bulk storage of seeds to a seed meter(s) arranged on the planter. Seeds are singulated in the seed meter for individually releasing the seeds out of the seed meter. The seeds are delivered sequentially into the furrow during delivery events collectively defining a seeding session. Each delivery event defines a period of time for releasing an individual seed from the seed meter and directing the individual seed from the seed meter into the furrow. A delivery anomaly may be identified that corresponds to a failure to deliver an individual seed during at least one delivery event. A delivery anomaly value may be defined that corresponds to the delivery anomaly. A target seeding session performance value may be defined corresponding to a predetermined target spacing characteristic of seeds delivered from the seed meter. An observed seeding session performance value may be defined based on a performance characteristic of the seed meter during the seeding session. A determination may be made to make a corrective action based on an evaluation of the target seeding session performance value, the observed seeding session performance value, and the delivery anomaly value. The seed meter(s) may be controlled for making the corrective action so as to reduce a discrepancy between the target seeding session performance value and the observed seeding session performance value.

According to another aspect of the invention, the observed seeding session performance value may define an average delivery rate of seeds from the seed meter during the seeding session. Detecting the delivery anomaly may include at least one of sensing a presence of a seed or an absence of a seed during each of the delivery events. The delivery anomaly may include a first delivery anomaly component that is defined by the at least one of sensing a presence of a seed or absence of a seed during each of the delivery events. The delivery anomaly may include a second delivery anomaly component that is determined by evaluating the first delivery anomaly component with respect to the observed seeding session performance value. The sensed absence of a seed during at least one delivery event may define a skip occurrence and the first delivery anomaly component may correspond to a frequency of skip occurrences during the seeding session. A presence of more than one seed during the delivery event may define a double occurrence and the second delivery anomaly may correspond to a frequency of double occurrences during the seeding session. The frequency of double occurrences during the seeding session may be determined by evaluating the frequency of skip occurrences during the seeding session with the average delivery rate of seeds from the seed meter during the seeding session.

According to another aspect of the invention, the seeding session and a subsequent seeding session occur during a single planting operation of the agricultural field. Controlling the seed meter may include adjusting an airflow directed to the seed meter. The seed meter may include a rotating seed disk defining a pressure differential across it for conveying individual seeds through the seed meter. Controlling the seed may include adjusting the pressure differential across the seed disk or adjusting a rotational speed of the seed disk. The seed meter may include a singulator arranged with respect to the seed disk for inhibiting more than one seed being delivered during a single delivery event. The seed meter may be controlled by adjusting a setting of the singulator so that the singulator acts more or less aggressively in removing extra seeds from a seed pocket of the seed disk.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
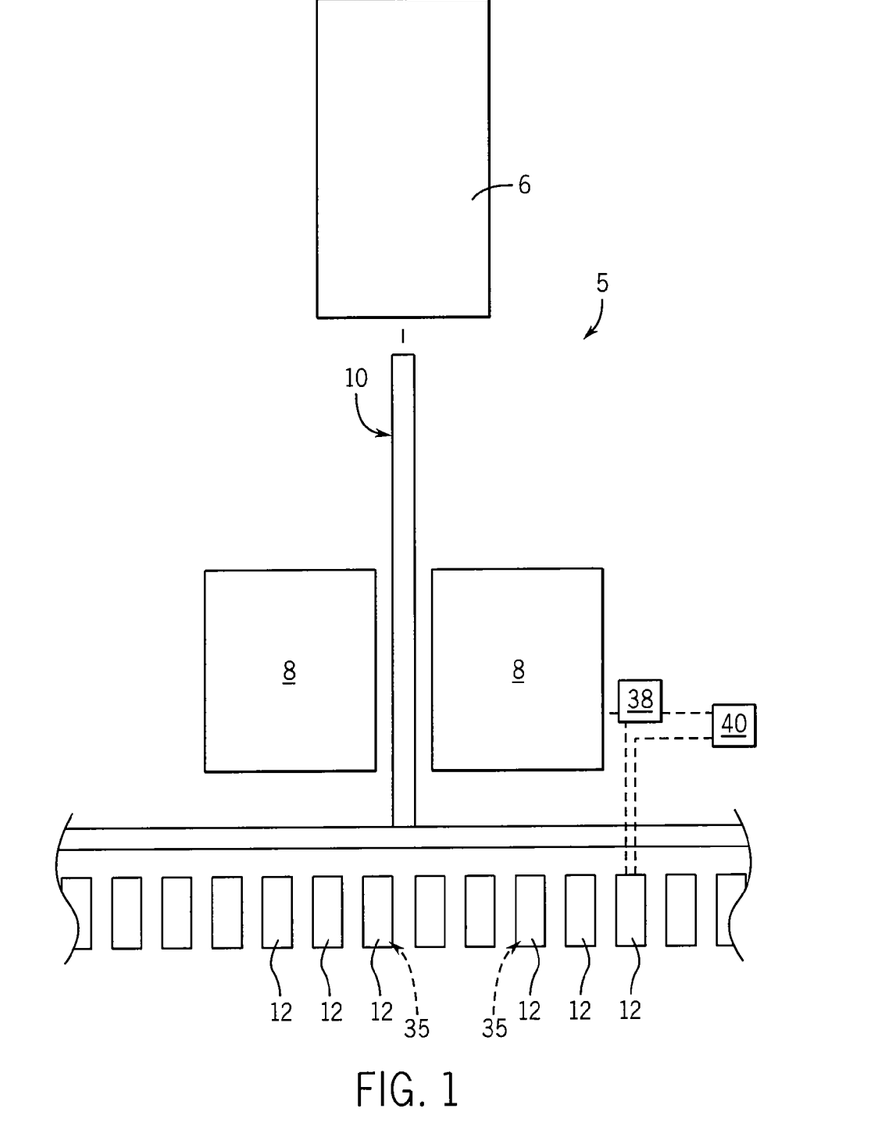
FIG. 1 is a schematic representation of a tractor pulling a planter that incorporates a seed meter control system in accordance with the present invention.

Referring now to the drawings and specifically to FIG. 1, a portion of a multiple row crop planter implement or planter 5 is schematically shown. The planter 5 may be one of the EARLY RISER® series planters available from Case IH and is typically pulled by a traction device such as a tractor 6. In this embodiment, seed is held in bulk storage in primary seed hoppers 8 that are supported by a frame 10. The seeds are pneumatically, or otherwise, directed through a seed conduit (not shown) to various row planting units 12 that are also supported by the planter frame 10. The row planting units 12 are substantially identical and each can deliver seeds individually for row crop planting in an agricultural field, as is explained in greater detail elsewhere herein.

Figure 2:
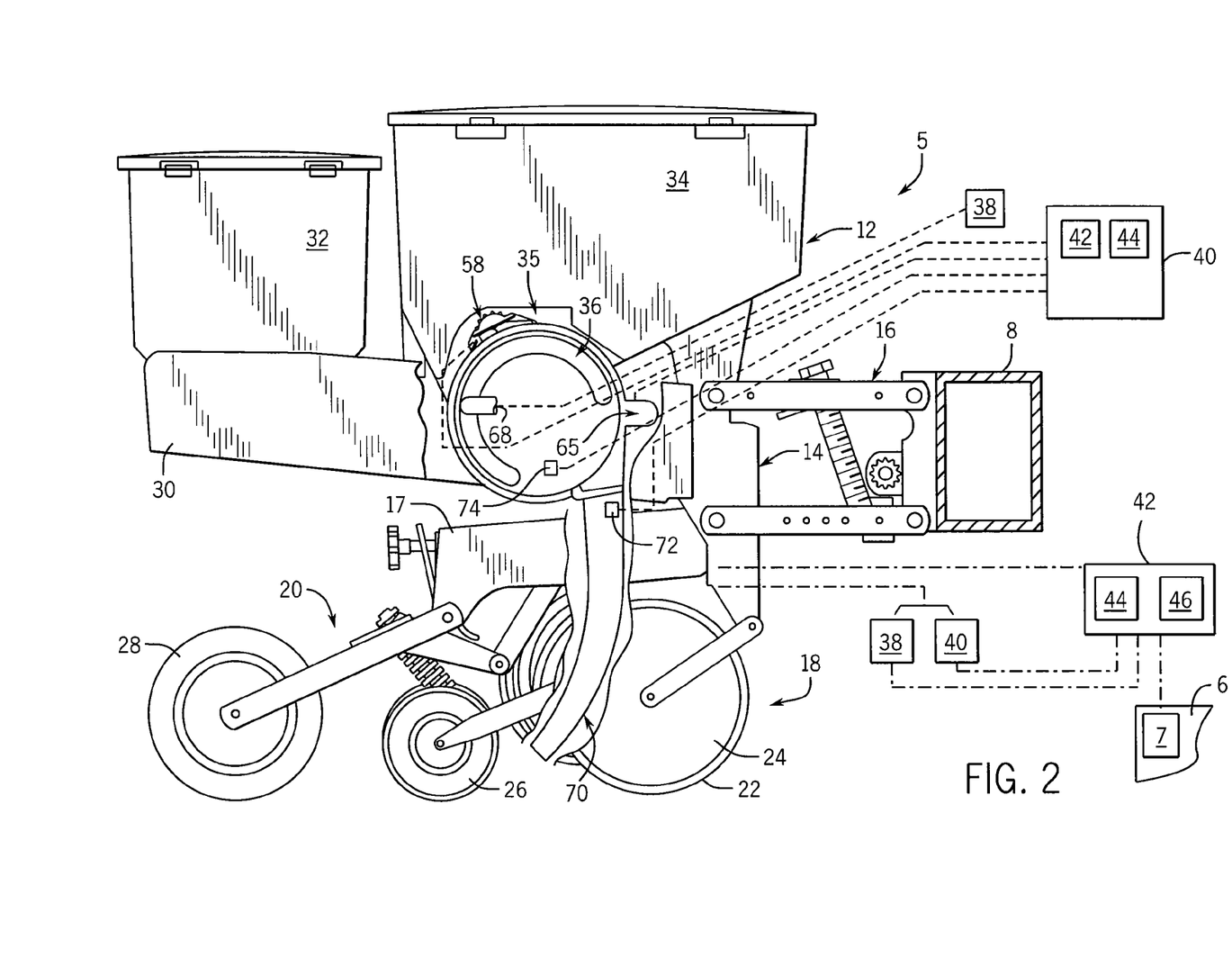
FIG. 2 is a side elevational view of a portion of the planter of FIG. 1 incorporating the seed meter control system of the present invention.

Referring now to FIG. 2, in this embodiment, the seeds are not held remotely for the row planting units 12 as was shown in FIG. 1. Instead, the seed for each row planting unit 12 is held at each of the row planting units 12, only one of which is shown for simplicity. Each row planting unit 12 includes a sub-frame 14 that is connected to the frame 10 by way of a parallel linkage system 16. A lower portion of the sub-frame 14 supports a furrow-opening mechanism 18 and a rearwardly extending bracket 17 upon which a furrow-closing mechanism 20 is arranged behind the furrow-opening mechanism 18. The furrow-opening mechanism 18 includes an opener disk(s) 22 that penetrates the soil and creates a furrow and gauge wheel 24 that has a limited displacement relative to the opener disk(s) 22. This allows the depth of the furrow to be selected by an operator by adjusting the amount of permitted movement of the gauge wheel 24 so as to control the depth to which the opener disk(s) 22 can penetrate the soil. The furrow-closing mechanism 20 includes a closing disk(s) 26 that closes the furrow after the row planting unit 12 deposits seeds into the furrow and a press wheel 28 that rolls over the closed furrow to firm the soil over the seed to further close the furrow and promote favorable seed-to-soil contact.

Still referring to FIG. 2, the sub-frame 14 includes a shelf 30 that is arranged above and generally parallel to the backbone 17. Shelf 30 is shown supporting an optional pesticide hopper 32 that contains, e.g., an herbicide or an insecticide, along with a known pesticide dispensing system (not shown) for applying controlled amounts of the contents in the desired location(s) while using the planter 5. Shelf 30 also supports a seed hopper 34 that holds the seed supply for planting by the row planting unit 10. Regardless of whether seeds are stored in seed hopper 34 (FIG. 2) or remotely in the bulk seed hoppers 8 (FIG. 1), the seeds are directed to a seed delivery system 35 that includes a seed meter 36. An airflow system 38 is operably connected to the seed meter 36 for establishing airflows for pneumatically conveying seed from primary seed hoppers 8 to the individual row units for embodiments that use remote bulk storage tanks for seed storage. The airflow system 38 is also operably connected to the seed meter 36 for establishing airflows to and through the seed meter 36 which may create a vacuum and/or positive pressures to and within the seed meter 36 for its singulating and delivery functions, as described in greater detail elsewhere herein. The airflow system 38 includes known pumps, fans, blowers, and/or other known system components.

Each seed meter 36 is operably connected to a seed meter control system 40 that includes a controller 42 for monitoring and/or controlling the seed meter(s) 36, and the airflow system 38 which may include detecting intervals between seeds delivered by the seed meter(s) 36 and determining performance and/or performance characteristics based on statistical calculations and/or other characteristics of the intervals. This may allow for controlling operating parameters of the seed meters 36 and/or the airflow system 38 with the seed meter control system 40 to provide relatively more consistent in-row spacing between adjacent seeds, explained in greater detail elsewhere herein. The controller 42 can include an industrial computer or, e.g., a programmable logic controller (PLC), along with corresponding software and suitable memory for storing such software and hardware including interconnecting conductors for power and signal transmission for controlling electronic or electro-mechanical components of the seed meter 36, which may include controlling at least portions of the airflow system 38 to influence performance of the seed meter 36. A user console 44 is operably connected to the controller 42 and includes a user interface such as indicator lights, a display, buttons, switches, and/or levers that can be manipulated by an operator to control operation seed meters 36 from within the cab of the tractor 6, which may include performing correction actions by controlling the seed meter(s) 36 by way of the console. In one embodiment, the user console 44 may be an Early Riser III™ monitor or an AFS PRO 700™ touch screen display available from Case IH.

Figure 3:
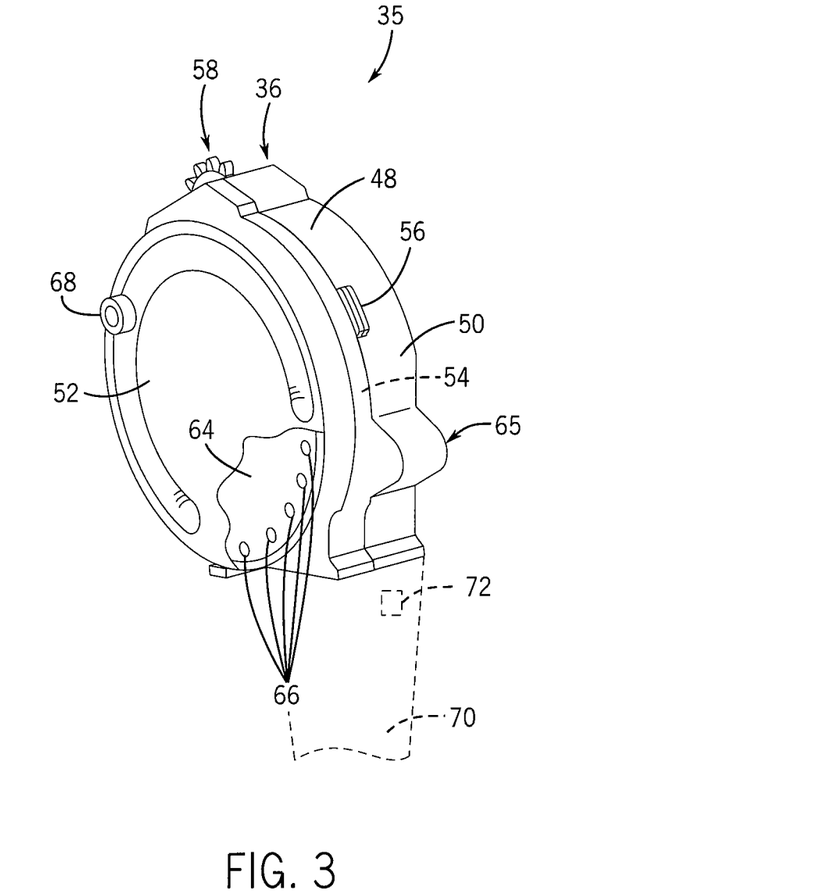
FIG. 3 is a simplified pictorial view of a seed meter used with the seed meter control system.
Figure 4:
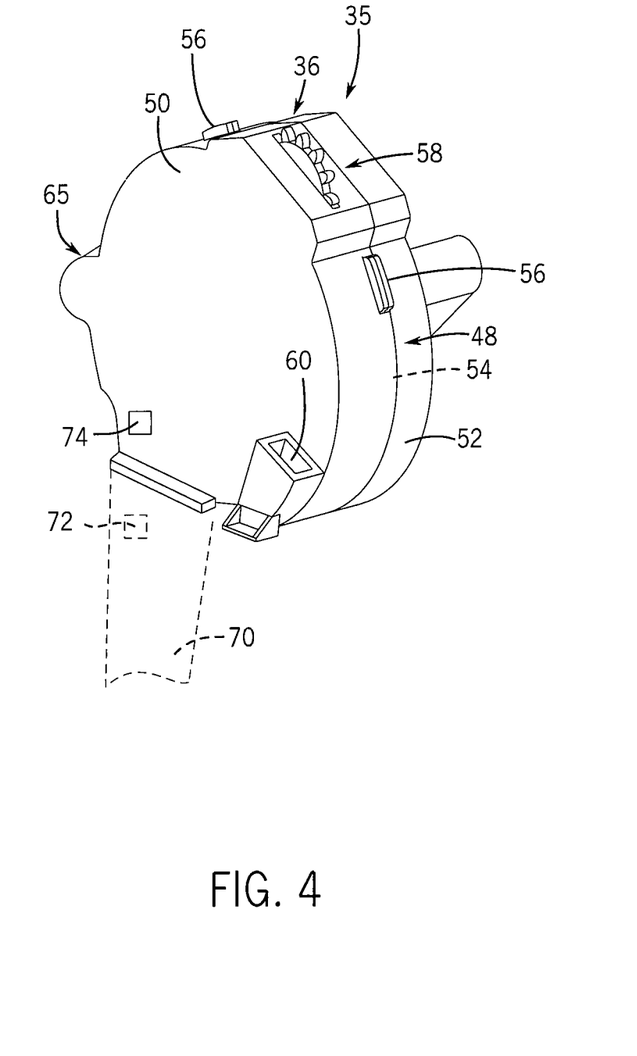
FIG. 4 is another simplified pictorial view of a seed meter used with the seed meter control system.

Referring now to FIGS. 3 and 4, the seed meter 36 of this embodiment is shown as being a pneumatic seed meter that uses pneumatic pressure for various operations. In another embodiment, the seed meter 36 may be a purely mechanical-type seed meter. The illustrated seed meter 36 includes a multi-component housing 48 that supports the entire seed meter 36 and its components and temporarily holds the seed that is being metered. The housing 48 includes a meter cover 50 and a seed disk cover 52 that engage each other at respective outer peripheries so as to define a cavity 54 inside of the housing 48. A seed singulator 58 that is configured to inhibit more than one seed from being discharged from the seed meter 36 per seed discharge event is arranged on the housing 48. The seed singulator 58 has multiple spools (not shown) and are arranged on opposing sides of seeds as they travel through the singular 58 so as to prevent groups of more than one seed and single seeds that are spaced from each other while traveling through the remainder of seed meter 36. The seed singulator 58 has multiple settings and is adjustable so that different settings can be selected to vary the spacing between the spools (not shown), for example, by way of a motor, to provide different, more aggressive or less aggressive, singulating action within the seed meter 36. The seed singulator 58 may be operably connected to the seed meter control system 40 for adjusting the setting of the seed singulator 58 and more or less aggressive singulating action. A seed opening 60 (FIG. 4) extends into the meter cover 50 and provides an entry through which the seeds enter the seed meter 36 so that the seeds can be held in an area of the meter housing cavity 54 that is confined by a divider wall (not shown) and a seed disk 64 (FIG. 3) that is rotatably arranged in the housing cavity 54. As shown in FIG. 4, a drive assembly 65 is mounted to the seed meter 36 for driving the rotating components of the seed meter 36. Drive assembly 65 is operably connected to and controlled by the seed meter control system 40 (FIG. 2) and may include, for example, various electric or hydraulic motors, drive shafts, chains and belts, peg and hole drive systems, and/or other arrangements such as a directly driven arrangement in which a motor directly drives the seed disk 64 at its center or at its periphery, as is known.

Referring now to FIG. 3, as is known, seed disk 64 includes seed pockets 66 that are discrete openings that include holes that extend between front and back surfaces and thus through the entire thickness of the seed disk 64. The seed pockets 66 are spaced from each other and, in this embodiment, are arranged in a single circle-shaped pattern. In other embodiments of the seed disk 64 that are configured for planting relatively small seeds like soybeans and sorghum, relatively more seed pockets 66 are provided and are arranged in patterns of multiple concentric circles so that the seed pockets 66 occupy a relatively larger percentage of the surface area of the seed disk 64. A vacuum inlet 68 and vacuum supply hose (not shown) connect the seed meter 36 to a vacuum source of the airflow system 38. The vacuum inlet 68 is arranged on the seed disk cover 52 for creating a vacuum pressure within a portion of the cavity 54 for holding seeds within the seed pockets 66 of the seed disk 64 while the seeds travel through the seed meter 36.

Referring now to FIGS. 2, 3, and 4, a seed tube 70 is arranged downstream of a cutoff location within the seed meter 36 through which the seed pockets 66 pass for releasing each seed from a respective seed pocket 66, through an outlet of the seed meter 36 and into the seed tube 70. The seed tube 70 extends from the outlet of the seed meter 36 and is arranged for delivering the singulated, individual seeds into the furrow of the agricultural field. A period of time for releasing an individual seed from the seed meter 36 and directing the individual seed from the seed meter into the furrow through the seed tube 70 defines a delivery event. Multiple delivery events, for example, sequential delivery events, may define a seeding session. Multiple seeding sessions may occur during a single planting operation of the agricultural field, such that a first seeding session and a second seeding session may be separated by an adjustment of at least one of the seed meters 36, without the planter 5 leaving the agricultural field and that may be done on the go, without stopping.

Still referring to FIGS. 2, 3, and 4, a seed sensor 72 is arranged with respect to the seed tube 70 for detecting seed presence while seed is being delivered from the seed meter 36 into the furrow during the delivery event. The seed sensor 72 detects passage of seed(s) during delivery of each delivery event and provides a corresponding signal to the seed meter control system 40. In another embodiment, the seed sensor 72 is arranged inside of the seed meter 36 instead of the seed tube 70 for detecting presence of singulated seed being released from the seed meter 36 during the delivery event. In one embodiment, the seed sensor 72 is an optical sensor that may include a light source and a light sensor arranged on opposing sides of where the seeds travel for detecting presence of seeds traveling between the light source and sensor. A pressure sensor 74 is arranged within the seed meter 36 for detecting an amount of pressure within the seed meter 36, which may correspond to a vacuum pressure differential across the seed disk 64, and provides a corresponding signal to the seed meter control system 40.

Figure 5:
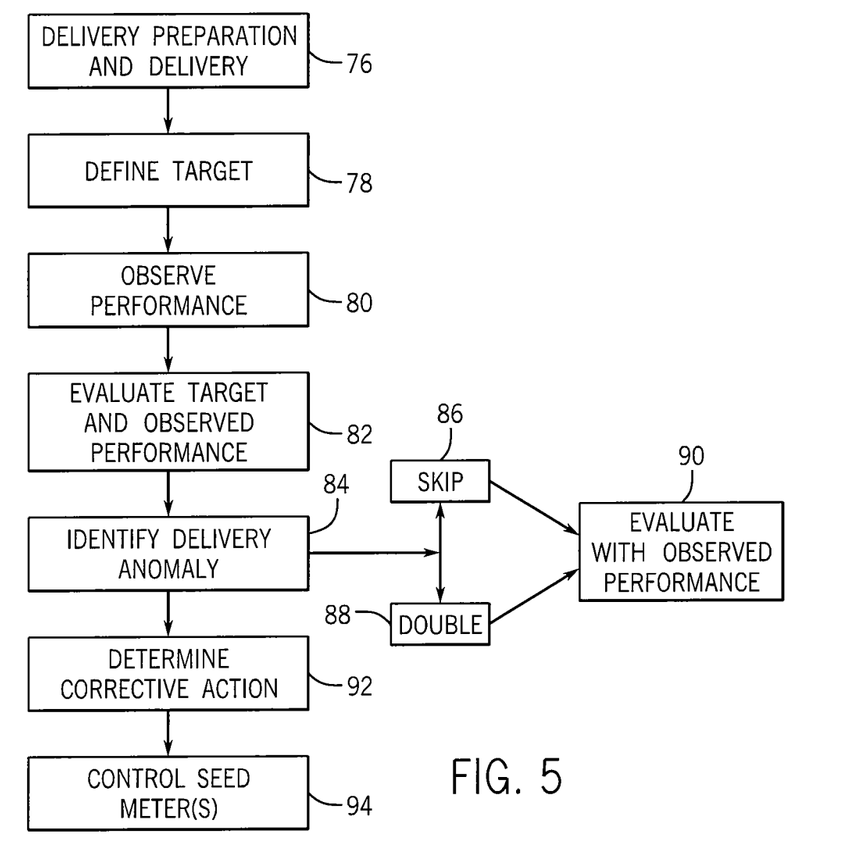
FIG. 5 is a flowchart of a use procedure of the seed meter control system.

Referring now to FIG. 5 with further reference to FIG. 2, the seed meter control system 40 may control the seed meter(s) 36 in generally the following way to control in-row seed spacing. As represented at block 76, delivery preparation and a seed delivery is performed. This may include towing the planter 5 through the agricultural field so that the furrow-opening mechanism(s) 18 create a furrow(s) for receiving seed. Seeds may be delivered from a hopper 8 (FIG. 1), 34 (FIG. 2) to the seed meter(s) 36 (FIG. 2) that singulate the seeds for individual release from the seed meter(s) 36. Singulated seeds are delivered sequentially into the furrow during delivery events that collectively define a seeding session.

Still referring to FIG. 5 with further reference to FIG. 2 as represented at block 78, a target seeding session performance value may be defined. The target seeding session performance value may correspond to a desired performance characteristic of the seed meter(s) 36, such as a predetermined target spacing characteristic of seeds delivered from the seed meters. Such target seeding session performance value may be a spacing distance value, a delivery rate value such as an average delivery rate value, or a time between delivery events value. The target seeding session performance value may be stored in the memory of the controller 42 and may be selectable by the operator through the user console 44, for example, by selecting or defining a seed type, desired plant population density, or other operating characteristic through the user console 44 so as to define the target seeding session performance value. As represented at block 80, an observed seeding session performance value of the seed meter(s) 36 may be defined based on actual operation during the seeding session. Such observed seeding session performance value may be a spacing distance value, a delivery rate value such as an average delivery rate value, or a time between delivery events value that may be based on the signals from the seed sensors 72 sent to the controller 42 during the seeding session and that may be stored by the seed meter control system 40 as corresponding data.

Still referring to FIG. 5 with further reference to FIG. 2 as represented at block 82, an evaluation of the target and observed seeding session performance values with respect to each other can be made. In one embodiment, target and observed seeding session performance values are average delivery rates of the seed meter(s) 36 which the controller 42 evaluates with respect to each other to determine whether the observed average delivery rate defines an acceptable value. An acceptable value may be defined by target and observed average delivery rates that correspond closely to each other, for example, differing by less than about 5%, 2%, or another value that is stored by the seed meter control system 40 as being an acceptable discrepancy between the target and observed average delivery rates or that has been selected by the operator as an acceptable discrepancy. An unacceptably low or high value may be defined by observed an average delivery rate that is more than about 5% or other predetermined value less or greater than the target delivery rate, respectively. The controller 42 can also make acceptable/unacceptable value determinations for performance discrepancies by way of standard deviation analyses based on periodic calculations using stored data corresponding to performance characteristics of the seed meter(s) 36. Substantially, the same evaluation can be made for the other target and observed seeding session performance values, besides average delivery rates.

Still referring to FIG. 5 with further reference to FIG. 2 as represented at block 84, based on the signal(s) sent from the seed sensors 72, the controller 42 may identify a delivery anomaly corresponding to a failure to deliver an individual seed during at least one delivery event during the seeding session. The delivery anomaly can be a skip occurrence in which no seeds are delivered during a delivery event. This may happen when there is no seed in a seed pocket 66 during rotation of the seed disk 64 so that during a delivery event, there is no seed to release into the seed tube 70 when such particular empty seed pocket 66 passes through the cutoff location of the seed meter 36. The delivery anomaly can also be a double occurrence in which more than one seed is delivered during a delivery event. This may happen when there are two or more seeds in a seed pocket 66 during rotation of the seed disk 64 so that during a delivery event, the two or more seeds of the seed pocket 66 are simultaneously released from the seed disk 64 and into the seed tube 70 when such particular over-capacity seed pocket 66 passes through the cutoff location of the seed meter 36. The controller 42 may define a delivery anomaly value that corresponds to the delivery anomaly. In one embodiment, the delivery anomaly value may indicate whether a skip occurrence for a double occurrence has happened at one or more of the seed meters 36. This delivery anomaly value may be indicative of a total number of skip and/or double occurrences during the seeding session, a percentage or ratio of skip and/or double occurrences with respect to normal placement occurrences during the placement events, or may correspond to a frequency of such skip and/or double occurrences during the seeding session. Like the acceptable values and unacceptably low and high values of the target and observed seeding session performance values, the delivery anomaly values may define predetermined acceptable values and unacceptably low and high values based on acceptable discrepancy information stored by the seed meter control system 44 or that is selected by the operator.

Still referring to FIG. 5 with further reference to FIG. 2 as represented at blocks 86 and 88, in one embodiment, the delivery anomaly can include multiple delivery anomaly components. A first delivery anomaly component may correspond to one of a skip and double occurrence(s) and a second delivery anomaly component may correspond to the other one of a skip and double occurrence(s). In this way, each of the first and second delivery anomaly components may be indicative of a total number of the respective skip or double occurrences during the seeding session, a percentage or ratio of the respective skip or double occurrences with respect to normal placement occurrences during the placement events, or may correspond to a frequency of the respective skip or double occurrences during the seeding session. Like the acceptable values and unacceptably low and high values of the target and observed seeding session performance values and those of the delivery anomaly values, the first and second delivery anomaly components, and thus the skip and double occurrences, may define predetermined acceptable values and unacceptably low and high values based on acceptable discrepancy information stored by the seed meter control system 44 or that is selected by the operator. Presence of at least one of the first and second delivery anomaly components defines an unacceptable value that may correspondingly define an unacceptable delivery anomaly value.

Still referring to FIG. 5 with further reference to FIG. 2, the first delivery anomaly component may correspond to the signal(s) from the seed sensor 72 and thus the sensed presence or absence of seeds during the delivery events, whereby the first delivery anomaly component may be an observed delivery anomaly component. The second delivery anomaly component may be a calculated delivery anomaly component, instead of being observed, as represented at block 90. This may be done so as to determine the second delivery anomaly component by evaluating the first delivery anomaly component with respect to the observed seeding session performance value. In one embodiment, the target and observed seeding session performance values are average delivery rates and the seed meter control system 40 monitors skip occurrences during the seeding session such that the first delivery anomaly component is defined by the skip occurrences. If the observed average delivery rate(s) is acceptable and the skip occurrences of the first delivery anomaly component is relatively high, then the controller 42 may determine that the double occurrences of the second delivery anomaly component is also relatively high, such that the extra seeds during by the double occurrences balance out the fewer seeds provided during the skip occurrences to provide the overall acceptable observed average delivery rate. If the observed average delivery rate(s) is unacceptably low and the skip occurrences of the first delivery anomaly component is relatively high, then the controller 42 may determine that the double occurrences of the second delivery anomaly component is nominal, whereby the skip occurrences of the first delivery anomaly component may be a primary influence on the unacceptably low observed average delivery rate. If the observed average delivery rate(s) is unacceptably high and the skip occurrences of the first delivery anomaly component is relatively high, then the controller 42 may determine that the double occurrences of the second delivery anomaly component is substantially more than the skip occurrences of the first delivery anomaly component, whereby the double occurrences of the second delivery anomaly component may be a primary influence on the unacceptably high observed average delivery rate. The same evaluations can be made when the seed meter control system 40 monitors double occurrences during the seeding session such that the first delivery anomaly component is defined by the double occurrences, such that the evaluations provide the reverse of the above results with respect to the skip and double occurrences. Substantially, the same evaluation can be made for the other target and observed seeding session performance values, besides average delivery rates.

Still referring to FIG. 5 with further reference to FIG. 2 as represented at block 92, the controller 42 can determine that a corrective action(s) should be made to at least one of the seed meters 36. The controller 42 may determine that a corrective action should be made based on an evaluation (s) of the target seeding session performance value, the observed seeding session performance value, and the delivery anomaly value. The controller 42 may determine that a corrective action(s) should be made based on the evaluation of the target and observed seeding session performance values with respect to each other, for example, when the observed seeding session performance value defines an unacceptable value. The controller 42 may then evaluate the first and second delivery anomaly components to determine whether a corrective action(s) should attenuate skip occurrences and/or double occurrences.

Still referring to FIG. 5 with further reference to FIG. 2 and as represented at block 92, even when the observed seeding session performance value defines an acceptable value, the controller 42 further evaluates the observed seeding session performance value with respect to the delivery anomaly value to determine whether a corrective action(s) should be made despite the acceptable observed seeding session performance value. If both the observed seeding session performance value and the delivery anomaly value are acceptable, the controller 42 may determine that the seed meter(s) 36 is in good working order, whereby no corrective action(s) should be made. In such situation, the controller 42 or the operator may determine that the planter 5 can be operated at a faster ground speed. If the observed seeding session performance value is acceptable and the delivery anomaly value is unacceptable, then the controller 42 may evaluate the first and second delivery anomaly components to determine whether a corrective action(s) should attenuate skip occurrences and/or double occurrences.

Still referring to FIG. 5 with further reference to FIG. 2 and as represented at block 94, as a corrective action(s), at least one of the seed meters 36 is controlled so as to attenuate skip occurrences and/or double occurrences. This may be done manually by the operator or automatically by the seed meter control system 40. The manual control of the seed meter(s) 36 is a corrective action that can be done by the operator manually changing a setup of the seed meter(s) 36, at the seed meter(s) 36 itself, or may be done from within the cab of the tractor 6, for example, by way of controlling the seed meter(s) 36 using the user console 44. The automatic control of the seed meter(s) 36 is a corrective action that can be done by the seed meter control system 40 itself, which may include the controller 42 controlling operating characteristics of the seed meter(s) 36 by way of predetermined commands based on instructions of the stored software of the seed meter control system 40. Controlling the seed meter(s) 36 may include controlling the airflow system 38 to vary the pneumatic operating characteristics of the seed meter 36, including the vacuum pressure within the seed meter 36 and the pressure differential across the seed disk 34. A setting of the singulator 58 may be adjusted for controlling the seed meter(s) 36. Adjusting a rotational speed of the seed disk 34 may be done for controlling the seed meter(s) 36. If the controller 42 determines that both skip and double occurrences should be attenuated, then the controller 42 may command the user console 44 to display a suggestion to operate the planter 5 at a slower ground speed. After such change in speed, the controller 42 reevaluates the performance during a subsequent seeding session. To attenuate skip occurrences, the controller 42 may command the user console 44 to display a suggestion to do at least one of operating the planter 5 at a slower ground speed and for the relevant seed meter(s) 36, adjust the singulator 58 to a less aggressive setting, control the airflow system 38 to increase the vacuum in the seed meter 36 and/or the pressure differential across the seed disk 34, or clean the seed pockets 66 of the seed disk 64. For a purely mechanical-type seed meter 36, the controller 42 may command the user console 44 to display a suggestion to inspect and repair the pickup fingers of the seed meter 36. To attenuate double occurrences, the controller 42 may command the user console 44 to display a suggestion to do at least one of operating the planter 5 at a slower ground speed and for the relevant seed meter(s) 36, adjust the singulator 58 to a more aggressive setting, control the airflow system 38 to decrease the vacuum in the seed meter 36 and/or the pressure differential across the seed disk 34. In one embodiment, the controller 42 may automatically do various ones of the controlling tasks of the seed meter(s) 26 for making a corrective action(s) by executing the predetermined commands based on instructions of the stored software of the seed meter control system 40. Regardless, after a corrective action(s) has been made by controlling the seed meter(s) 36, the reevaluates performance and if the delivery anomaly value remains unacceptable, the controller 42 may command the user console 44 to display a suggestion for further corrective action(s) and/or for an inspection of the seed meter(s) 36 and its components.

Many changes and modifications could be made to the invention without departing from the spirit thereof. The scope of these changes will become apparent from the appended claims.

The invention claimed is:

1. A method of controlling a seed meter while row-crop planting, the method comprising:

opening a furrow in an agricultural field with a furrow-opening mechanism mounted to a planter and arranged for engaging the agricultural field;

delivering seeds from a hopper for bulk storage of seeds to a seed meter arranged on the planter;

singulating seeds in the seed meter for individually releasing the seeds out of the seed meter;

delivering seeds sequentially into the furrow during delivery events collectively defining a seeding session, wherein each delivery event defines a period of time for releasing an individual seed from the seed meter and directing the individual seed from the seed meter into the furrow;

defining a target seeding session performance value corresponding to a predetermined target spacing characteristic of seeds delivered from the seed meter;

defining an observed seeding session performance value based on a performance characteristic of the seed meter during the seeding session;

identifying a delivery anomaly corresponding to a failure to deliver an individual seed during at least one delivery event and defining a corresponding delivery anomaly value, the delivery anomaly includes a first delivery anomaly component that is defined by the at least one of sensing a presence of a seed or absence of a seed during each of the delivery events and a second delivery anomaly component that is determined by evaluating the first delivery anomaly component with respect to the observed seeding session performance value and corresponds to a frequency of double occurrences during the seeding session;

determining the frequency of double occurrences during the seeding session by evaluating the frequency of skip occurrences during the seeding session with an average delivery rate of seeds from the seed meter during the seeding session;

determining to make a corrective action based on an evaluation of the target seeding session performance value, the observed seeding session performance value, and the delivery anomaly value; and controlling the seed meter to make the corrective action for reducing the delivery anomaly value.

2. The method of claim 1 wherein the observed seeding session performance value defines the average delivery rate of seeds from the seed meter during the seeding session.

3. The method of claim 1 wherein the sensed absence of a seed during at least one delivery event defines a skip occurrence and wherein the first delivery anomaly component corresponds to a frequency of skip occurrences during the seeding session.

4. The method of claim 1 wherein the seeding session and a subsequent seeding session occur during a single planting operation of the agricultural field.

5. The method of claim 4 wherein controlling the seed meter includes adjusting an airflow directed to the seed meter.

6. The method of claim 4 wherein the seed meter includes a seed disk defining a pressure differential across the seed disk for conveying individual seeds through the seed meter, and wherein controlling the seed meter includes adjusting the pressure differential across the seed disk.

7. The method of claim 4 wherein the seed meter includes a seed disk for conveying individual seeds through the seed meter and a singulator arranged with respect to the seed disk for inhibiting more than one seed being delivered during a single delivery event, and wherein controlling the seed meter includes adjusting a setting of the singulator.

8. The method of claim 4 wherein the seed meter includes a seed disk for conveying individual seeds through the seed meter and wherein controlling the seed meter includes adjusting a rotational speed of the seed disk.

9. A method of controlling seed meters while row-crop planting, the method comprising:

delivering seeds from a hopper for bulk storage of seeds to multiple seed meters arranged on a planter, the planter opening multiple furrows in an agricultural field;

singulating the seeds in each of the multiple seed meters and delivering the seeds from each of the multiple seed meters for individual delivery into a respective furrow during delivery events defining a seeding session, wherein each delivery event defines a period of time for releasing an individual seed from the seed meter and directing the individual seed from the seed meter into the furrow;

defining a target seeding session performance value corresponding to a predetermined target spacing characteristic of seeds delivered from the seed meters;

defining an observed seeding session performance value based on a performance characteristic of the seed meter during the seeding session;

identifying a delivery anomaly corresponding to a failure to deliver an individual seed during at least one delivery event, wherein the delivery anomaly includes at least a first delivery anomaly component and a second delivery anomaly component;

the first delivery anomaly component defined by sensing a presence of a seed or an absence of a seed during each of the delivery events wherein the sensed absence of a seed during at least one delivery event defines a skip occurrence, the second delivery anomaly component defined by evaluating the first delivery anomaly component with the observed seeding session performance value, the second delivery anomaly component corresponding to a frequency of double occurrences during the seeding session;

determining the frequency of double occurrences during the seeding session by evaluating a frequency of skip occurrences during the seeding session with an average delivery rate of from the seed meter during the seeding session;

determining to make a corrective action based on an evaluation of the target seeding session performance value, the observed seeding session performance value; and at least one of the first and second delivery anomaly components; and controlling at least one of the seed meters to make the corrective action for reducing a value corresponding to at least one of the first and second delivery anomaly components.

10. The method of claim 9 wherein the observed seeding session performance value defines an average delivery rate of seeds from the seed meter during the seeding session.

11. The method of claim 10 wherein the first delivery anomaly component corresponds to the frequency of skip occurrences during the seeding session.

12. A seed meter control system for use with a planter opening multiple furrows in an agricultural field, the planter including multiple seed meters arranged on the planter and receiving seeds from a hopper for bulk storage of seeds, each of the multiple seed meters singulating the seeds for releasing the seeds out of the seed meter for individual delivery into a furrow during delivery events, wherein each delivery event defines a period of time for releasing an individual seed from the seed meter and directing the individual seed from the seed meter into the furrow, the seed meter control system comprising:

a seed sensor arranged with respect to each of the multiple seed meters for detecting seed presence during the delivery events and transmitting a corresponding signal; and a controller monitoring at least one performance characteristic of each of the seed meters and defining a corresponding observed seeding session performance value, the controller operably connected to the sensors of the seed meters for receiving the signals therefrom, the controller identifying a delivery anomaly based on the signals from the sensors of the seed meters corresponding to a failure to deliver an individual seed during at least one delivery event, wherein the delivery anomaly includes at least a first delivery anomaly component and a second delivery anomaly component, the first delivery anomaly component defining one of a frequency of skip occurrences wherein each skip occurrence corresponds to an absence of a seed during a delivery event and a frequency of double occurrences wherein each double occurrence corresponds to more than one seed delivered during a delivery event, and the controller being configured to determine the second delivery anomaly component by determining a frequency of double occurrences during a seeding session by evaluating a frequency of skip occurrences during the seeding session with an average delivery rate of seeds from the seed meter during the seeding session;

wherein:

the controller defines a target seeding session performance value corresponding to a predetermined target spacing characteristic of seeds delivered from the seed meters; the controller determining whether a corrective action is needed based on an evaluation of the target seeding on performance value, the observed seeding session performance value, and at least one of the first and second delivery anomaly components, and wherein the controller controls at least one of the seed meters to make the corrective action for reducing a discrepancy between the target seeding session performance value and the observed seeding session performance value.

13. The seed meter control system of claim 12 wherein the controller controls the at least one of the seed meters by adjusting an airflow directed to the at least one of the seed meters.

14. The seed meter control system of claim 12 wherein the controller controls the at least one of the seed meters by adjusting at least one of a setting of a singulator of the at least one of the seed meters, a pressure differential across a seed disk of the at least one of the seed meters, and adjusting a rotational speed of a seed disk of the at least one of the seed meters.

15. A method of controlling a seed meter while row-crop planting, the method comprising:

opening a furrow in an agricultural field with a furrow-opening mechanism mounted to a planter and arranged for engaging the agricultural field;

delivering seeds from a hopper for bulk storage of seeds to a seed meter arranged on the planter;

singulating seeds in the seed meter for individually releasing the seeds out of the seed meter;

delivering seeds sequentially into the furrow during delivery events collectively defining a seeding session, wherein each delivery event defines a period of time for releasing an individual seed from the seed meter and directing the individual seed from the seed meter into the furrow;

defining a target seeding session performance value corresponding to a predetermined target spacing characteristic of seeds delivered from the seed meters;

defining an observed seeding session performance value based on a performance characteristic of the seed meter during the seeding session;

identifying a delivery anomaly corresponding to a failure to deliver an individual seed during at least one delivery event and defining a corresponding delivery anomaly value;

determining to make a corrective action based on an evaluation of the target seeding session performance value, the observed seeding session performance value, and the delivery anomaly value; and controlling the seed meter to make the corrective action for reducing the delivery anomaly value;

wherein;

the observed seeding session performance value defines an average delivery rate of seeds from the seed meter during the seeding session;

identifying the delivery anomaly includes at least one of sensing a presence of a seed or an absence of a seed during each of the delivery events;

the delivery anomaly includes a first delivery anomaly component that is defined by the at least one of sensing a presence of a seed or absence of a seed during each of the delivery events;

the delivery anomaly includes a second delivery anomaly component that is determined by evaluating the first delivery anomaly component with respect to the observed seeding session performance value;

the sensed absence of a seed during at least one delivery event defines a skip occurrence and wherein the first delivery anomaly component corresponds to a frequency of skip occurrences during the seeding session; and a presence of more than one seed during the delivery event defines a double occurrence and wherein the second delivery anomaly component corresponds to a frequency of double occurrences during the seeding session such that the frequency of double occurrences during the seeding session is determined by evaluating the frequency of skip occurrences during the seeding session with the average delivery rate of seeds from the seed meter during the seeding session.

16. A method of controlling seed meters while row-crop planting, the method comprising:

delivering seeds from a hopper for bulk storage of seeds to multiple seed meters arranged on a planter, the planter opening multiple furrows in an agricultural field;

singulating the seeds in each of the multiple seed meters and delivering the seeds from each of the multiple seed meters for individual delivery into a respective furrow during delivery events defining a seeding session, wherein each delivery event defines a period of time for releasing an individual seed from the seed meter and directing the individual seed from the seed meter into the furrow;

defining a target seeding session performance value corresponding to a predetermined target spacing characteristic of seeds delivered from the seed meters;

defining an observed seeding session performance value based on a performance characteristic of the seed meter during the seeding session;

identifying a delivery anomaly corresponding to a failure to deliver an individual seed during at least one delivery event, wherein the delivery anomaly includes at least a first delivery anomaly component and a second delivery anomaly component;

the first delivery anomaly component defined by sensing a presence of a seed or an absence of a seed during each of the delivery events, the second delivery anomaly component defined by evaluating the first delivery anomaly component with the observed seeding session performance value;

determining to make a corrective action based on an evaluation of the target seeding session performance value, the observed seeding session performance value; and at least one of the first and second delivery anomaly components; and controlling at least one of the seed meters to make the corrective action for reducing a value corresponding to at least one of the first and second delivery anomaly components;

wherein:
the observed seeding session performance value defines an average delivery rate of seeds from the seed meter during the seeding session;

the sensed absence of a seed during at least one delivery event defines a skip occurrence and wherein the first delivery anomaly component corresponds to a frequency of skip occurrences during the seeding session; and a presence of more than one seed during the delivery event defines a double occurrence and wherein the second delivery anomaly component corresponds to a frequency of double occurrences during the seeding session such that the frequency of double occurrences during the seeding session is determined by evaluating the frequency of skip occurrences during the seeding session with the average delivery rate of seeds from the seed meter during the seeding session.

* * * * *